(12) United States Patent
Edmonds

(10) Patent No.: US 12,177,249 B2
(45) Date of Patent: *Dec. 24, 2024

(54) SYSTEMS AND METHODS THAT PERFORM FILTERING, LINKING, AND RENDERING

(71) Applicant: California Manufacturing Technology Consulting, Torrance, CA (US)

(72) Inventor: Ernest W. Edmonds, Kissimmee, FL (US)

(73) Assignee: California Manufacturing Technology Consulting, Long Beach, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/397,179

(22) Filed: Dec. 27, 2023

(65) Prior Publication Data
US 2024/0195832 A1  Jun. 13, 2024

Related U.S. Application Data

(63) Continuation of application No. 16/838,352, filed on Apr. 2, 2020, now Pat. No. 11,870,805.
(Continued)

(51) Int. Cl.
| | |
|---|---|
| *H04L 9/00* | (2022.01) |
| *G06F 16/93* | (2019.01) |
| *H04L 9/40* | (2022.01) |

(52) U.S. Cl.
CPC ......... *H04L 63/1466* (2013.01); *G06F 16/94* (2019.01); *H04L 63/0807* (2013.01); *H04L 63/1416* (2013.01); *H04L 63/20* (2013.01)

(58) Field of Classification Search
CPC ............ H04L 63/1466; H04L 63/0807; H04L 63/1416; H04L 63/20; H04L 63/101; G06F 16/94
See application file for complete search history.

(56) References Cited

U.S. PATENT DOCUMENTS

| | | |
|---|---|---|
| 2007/0238083 A1 | 10/2007 | Zamora |
| 2008/0005284 A1 | 1/2008 | Ungar et al. |

(Continued)

OTHER PUBLICATIONS

Cyber Security Evaluation Tool (CSET) Version 6.2, URL: https:/Avww.nationalacademies. org/event/03-24-2015/docs/D56AAE3284222F7 11AFC58A081 F20E858527926CA921, Published Mar. 24, 2015 (Year: 2015).*

(Continued)

*Primary Examiner* — Daniel B Potratz
*Assistant Examiner* — Syed M Ahsan
(74) *Attorney, Agent, or Firm* — Knobbe, Martens, Olson & Bear LLP

(57) ABSTRACT

A content management system comprising one or more processing devices, a network interface, and a memory system configured to store programmatic instructions configured to cause the one or more processing devices to perform the following operations is described. An electronic document may be generated and rendered, where the content management system may configure the electronic document as a mesh document, with both forward links and backlinks to other electronic resources. The forward links and/or backlinks may be to local electronic resources or remote electronic resources. The mesh document may be transmitted to client device over an encrypted channel, and the client device may render the electronic document. In response to an activation of a forward or backlink, the corresponding resource may be accessed from a data store, transmitted via the encrypted channel to the client device, and the client device may render such resource.

24 Claims, 8 Drawing Sheets

Related U.S. Application Data

(60) Provisional application No. 62/830,812, filed on Apr. 8, 2019.

(56) References Cited

U.S. PATENT DOCUMENTS

| | | | |
|---|---|---|---|
| 2008/0010249 A1 | 1/2008 | Curtis et al. | |
| 2008/0010387 A1 | 1/2008 | Curtis et al. | |
| 2008/0010609 A1 | 1/2008 | Curtis et al. | |
| 2008/0040661 A1 | 2/2008 | Curtis et al. | |
| 2008/0065759 A1 | 3/2008 | Curtis et al. | |
| 2009/0158145 A1 | 6/2009 | Schering | |
| 2009/0217267 A1 | 8/2009 | Gebhart et al. | |
| 2013/0198375 A1* | 8/2013 | Allen | G06F 40/134 709/224 |
| 2013/0204746 A1 | 8/2013 | Lee et al. | |
| 2014/0040275 A1 | 2/2014 | Dang et al. | |
| 2014/0047413 A1 | 2/2014 | Sheive et al. | |
| 2015/0019701 A1* | 1/2015 | Marvin | H04L 67/54 709/225 |
| 2016/0041817 A1 | 2/2016 | Whitney et al. | |
| 2016/0269182 A1 | 9/2016 | Sriram et al. | |
| 2016/0378855 A1 | 12/2016 | Roberts et al. | |
| 2017/0142076 A1* | 5/2017 | Ford | H04L 63/083 |
| 2018/0117447 A1 | 5/2018 | Tran et al. | |
| 2020/0201898 A1* | 6/2020 | Esponda | G06F 40/295 |

OTHER PUBLICATIONS

DokuWiki vs. MediaWiki vs. PmWiki vs. Tiki Wiki CMS Groupware https://www.wikimatrix.org/compare/dokuwiki+mediawiki+pmwiki+tiki-wiki-cms-groupware, downloaded on Jun. 30, 2020, 5 pages.

Fun with TikiWiki—InfoWorld, https://www.infoworld.com/article/2632307/fun-with-tikiwiki.html, downloaded on Jun. 30, 2020, 4 pages.

Manual: MediaWiki Architecture, 14 pages, downloaded Jun. 22, 2020, https://mediawiki.org/wiki/Manual:MediaWiki_architecture.

Manual: What is MediaWiki?, 3 pages, downloaded Jun. 23, 2020, https://www.mediawiki.org/wiki/Manual:What_is_MediaWiki%3F.

Tiki Feature Checklist, https://info.tiki.org/Features, downloaded on Jun. 30, 2020, 4 pages.

Tiki Wiki CMS Groupware, https://en.wikipedia.org/wiki/Tiki_Wiki_CMS_Groupware, downloaded on Jun. 30, 2020, 3 pages.

Wiki Software, 6 pages, downloaded Jun. 22, 2020, https://en.wikipedia.org/wiki/Wiki_software.

\* cited by examiner

SYSTEMS AND METHODS THAT PERFORM FILTERING, LINKING, AND RENDERING

INCORPORATION BY REFERENCE TO ANY PRIORITY APPLICATIONS

Any and all applications for which a foreign or domestic priority claim is identified in the Application Data Sheet as filed with the present application are hereby incorporated by reference under 1 CFR 1.57.

BACKGROUND

The present invention is generally related to filtering, linking and rendering.

Description of the Related Art

As computer and network hacking has become ever more pervasive and threatening, governmental entities, standards organizations, and business entities have identified and developed techniques and guidelines to enhance computer and network security. Such techniques and guidelines may be embodied in multiple electronic documents, which may be updated and modified as new risks are identified and new risk mitigation techniques and guidelines are developed for addressing such risks. Given the number of electronic documents involved and ongoing modifications of such electronic documents, it has become ever more challenging to implement risk mitigation techniques and comply with the risk mitigation guidelines embodied therein.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

An aspect of the disclosure relates to a content management system comprising one or more processing devices, a network interface, and a memory system configured to store programmatic instructions configured to cause the one or more processing devices to perform operations, such as those disclosed herein. An electronic document may be generated and rendered, where the content management system may configure the electronic document as a mesh document, with both forward links and backlinks to other electronic resources (e.g., document files, webpages, and/or the like). The forward links and/or backlinks may be to local electronic resources or remote electronic resources. By way of example, controls, terms, and/or solutions included in electronic documents may be linked in a mesh fashion.

The mesh document may be transmitted to client device over an encrypted channel, and the client device may render the electronic document. In response to an activation of a forward or backlink, the corresponding resource may be accessed from a data store, transmitted via the encrypted channel to the client device, and the client device may render such resource.

Resource modification requests may be received over an encrypted channel from a user. The resource modification request may specify an explicit resource to be modified and may include an identification of the resource modification requester. Such resource modification request may be granted or denied, and a corresponding recorded may be recorded indicating the grant or denial of the resource modification request.

Optionally, a client device may subscribe to certain mesh documents, and a notification may be transmitted to the client device when the subscribed-to mesh documents are edited and/or deleted. Optionally, selected mesh documents or sets of mesh documents may be downloaded from the content management system to a client device. Optionally, in response to the content management system detecting that a mesh document maintained by the content management system has been modified, the system may synchronize the modified mesh document so as to replace earlier versions of the mesh document that has been downloaded to user devices.

Disclosed herein is an example content management computer system comprising: a computing device; a network interface; a non-transitory computer readable media configured to store instructions that when executed by the computing device, cause the computing device to perform operations comprising: receive, via the network interface, an authentication token; use the authentication token to determine associated access permissions for mesh-linked files; identify, using the determined associated access permissions, permitted mesh-linked files; use the authentication token to determine modification permissions associated with the permitted mesh-linked files; enable, via the network interface, a user interface to be displayed, the user interface comprising entries corresponding to at least a portion of the permitted mesh-linked files, the entries corresponding to at least a portion of the permitted mesh-linked files organized in waterfall fashion; based at least in part on a determination that a modification permission associated with the authentication token provides permission to modify the permitted mesh-linked files, enable a modification control to be enabled and presented via the user interface; provide, via the user interface, a first set of links, comprising at least a search link, a statistics link, and a file galleries link; provide, via the user interface, a second set of links, comprising at least a compliance link, a tools link, and a local resources link; provide, via the user interface, a second set of links to indexes, comprising at least a management controls index, an operational control index, and a technical controls index; provide a backlink control, via the user interface; at least partly in response to detecting activation of the backlink control, enabling a plurality of backlinks to be displayed, the backlinks corresponding to incoming links from network resources, wherein activation of a backlink cause a corresponding network resource to be accessed over a network and rendered; at least partly in response activation of the modification control, enable a modification field to presented via the user interface, the modification field configured to receive user modifications with respect to one or more items of content of the user interface; and at least partly in response to receipt of a save or publish instruction, enable the modified content to be propagated or more in accordance with at least a first propagation rule, to one or more destinations.

Disclosed herein is an example computer-implemented method, the method comprising: receiving, via a network interface, an authentication token; using, by a computer system, the authentication token to determine associated access permissions for mesh-linked documents; identifying, using the determined associated access permissions, permitted mesh-linked documents; using the authentication token to determine, using the computer system, modification permissions associated with the permitted mesh-linked documents; enabling a user interface to be displayed, the user interface comprising entries corresponding to the permitted mesh-linked documents; based at least in part on a determination that a modification permission associated with the authentication token provides permission to modify the permitted mesh-linked documents, enabling a modification control; provide, via the user interface, a first set of links, comprising at least a compliance link and a resources link; providing, via the user interface, access to a plurality of control indexes comprising least a management controls index, an operational control index, or a technical controls index; providing a backlink control, via the user interface; at least partly in response to detecting activation of the backlink control, enabling a plurality of backlinks to be displayed, the backlinks corresponding to incoming links from network resources, wherein activation of a backlink cause a corresponding network resource to be accessed and rendered; at least partly in response activation of the modification control, enabling a modification interface to presented via the user interface, the modification interface configured to receive user modifications with respect to one or more items of content of the user interface; at least partly in response to receipt of a save instruction, enabling the modified content to be propagated or more in accordance with at least a first propagation rule, to one or more destinations.

Disclosed herein is an example non-transitory computer readable media configured to store instructions that when executed by a computing device, cause the computing device to perform operations comprising: receive an authentication token; use the authentication token to determine associated access permissions for mesh-linked documents; identify, using the determined associated access permissions, permitted mesh-linked documents; use the authentication token to determine, using the computer system, modification permissions associated with the permitted mesh-linked documents; enable a user interface to be displayed, the user interface comprising entries corresponding to the permitted mesh-linked documents; based at least in part on a determination that a modification permission associated with the authentication token provides permission to modify the permitted mesh-linked documents, enabling a modification control; provide, via the user interface, a first set of links, comprising at least a compliance link; provide, via the user interface, access to a plurality of control indexes; provide a backlink control, via the user interface; at least partly in response to detecting activation of the backlink control, enable a plurality of backlinks to be displayed, the backlinks corresponding to incoming links from network resources, wherein activation of a backlink cause a corresponding network resource to be accessed and rendered; at least partly in response activation of the modification control, enable a modification interface to presented via the user interface, the modification interface configured to receive user modifications with respect to one or more items of content of the user interface; and at least partly in response to receipt of a save instruction, enable the modified content to be propagated or more in accordance with at least a first propagation rule.

BRIEF DESCRIPTION OF THE DRAWINGS

Embodiments will now be described with reference to the drawings summarized below. Throughout the drawings, reference numbers may be re-used to indicate correspondence between referenced elements. The drawings are provided to illustrate example embodiments described herein and are not intended to limit the scope of the disclosure.

DESCRIPTION

Figure 1:
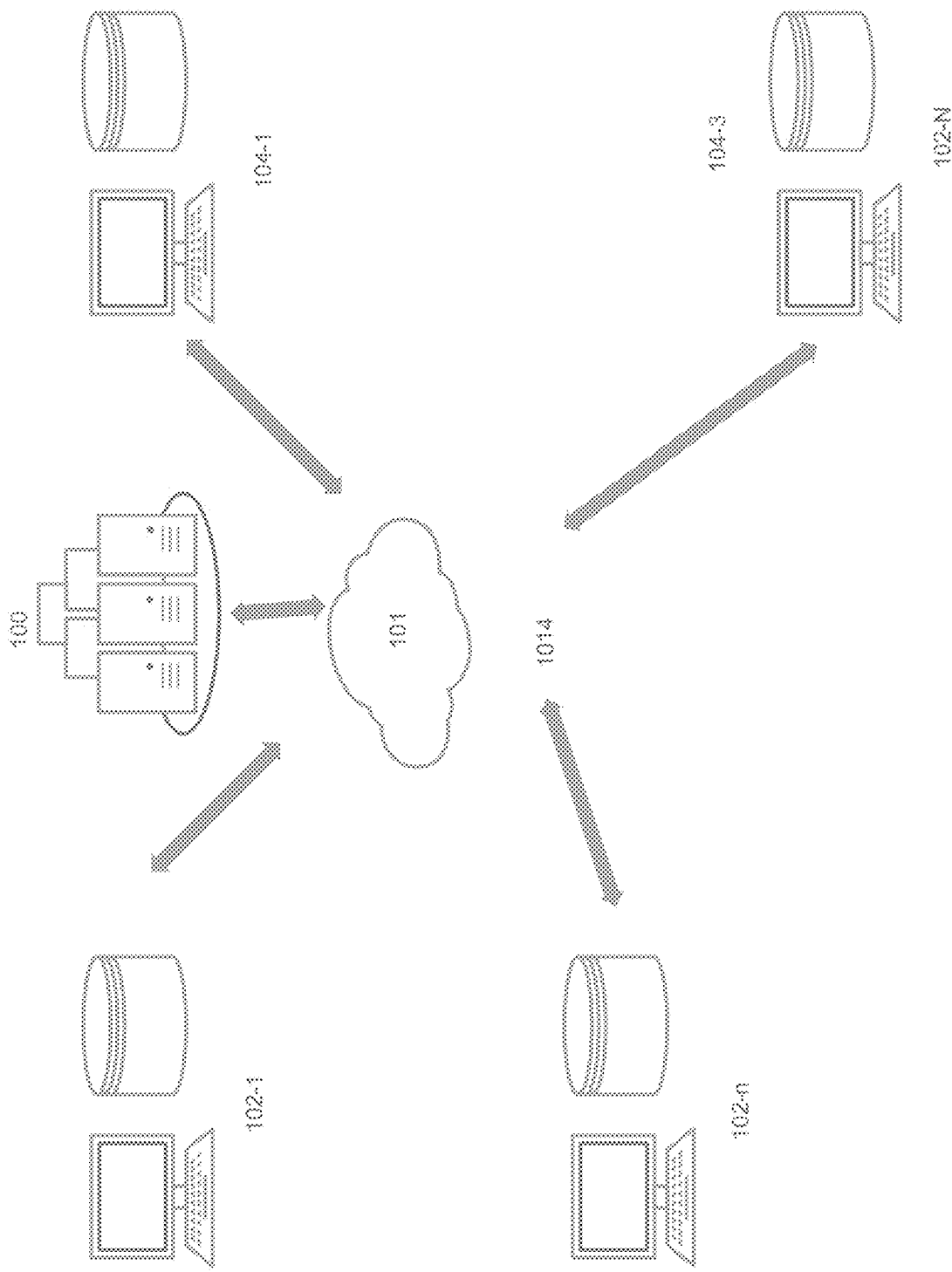
FIG. 1 illustrates an example environment.

Systems and methods are described that enable the filtering, linking and rendering of information, which may be embodied in large numbers of electronic documents and/or electronic files. The described systems and methods enable information to be efficiently collected, cross-referenced, and selectively distributed (e.g., via a networked site). Further, the described systems and methods enable collaboration within an organization or team, and enable the organization to access and follow, in common, techniques for addressing technical challenges such as those presented by cyber security or product manufacturing. Further, authorized users are enabled to add linked content in real time to further increase the efficacy of the site, to enable the site to evolve, and to ensure that the site is up-to-date. Optionally, certain linked documents may be designated as static to inhibit modification where consistency is needed to ensure users comply with certain procedures (e.g., third party procedures, such as from standards organizations).

Further described herein are graphical user interfaces for efficiently navigating compliance-related concepts found in compliance-related electronic documents, while reducing the need for complex user navigation that makes it difficult to locate desired data. The user interfaces enable compliance knowledge discovery processes. Further, systems and methods are described that facilitate compliance velocity with respect to certain practices, such as those relating product or materials manufacturing or information technology protection.

As will be described in greater detail herein, the electronic documents may be manufacturing-related or security-related compliance documents.

The system may comprise a content management system (e.g., a wiki content management system) hosted on one or more servers. The content (e.g., the documents, which may be multimedia documents including text, graphics, recorded audio and/or video content) may be stored in one or more system databases or files. The content management system may comprise a wiki engine which enables the creation and editing of various pages or other entries of a site, with the creation of internal crosslinks and backlinks.

The system may provide, via corresponding user interfaces, access control, modification control, document management, and version control. For example, the system may enable compliance information to be structured into discoverable and searchable subjects or categories. For example, the content management system may include or provide access to a search engine configured to enable a user to search through a user-selected standards document. The access control user interfaces may enable an administrator to provide various levels of access based on user roles. For example, the user interface may enable the administrator to permit or deny access to view and/or edit given pages based on a user's role.

Optionally, a user may request permission to edit a given page, set of pages, section, or an entire site. The edit request (e.g., in association with the identity of the edit requester and an identification of the page, set of pages, section, or site to be edited) may be automatically routed to an administrator, who may grant or not grant the requested edit permissions. Such request grants and/or request denials may be stored in a user account. Such a request may be time limited (e.g., limited to a specific period of time).

A search user interface enables a user to search through documents and entries stored by the content management system. The search user interface may include user-selectable search filters, such as filters that enable a user to filter search results to specified standards documents, specified compliance documents, specified file galleries, specified controls, and/or other content disclosed herein.

By way of example, the documents may comprise one or more standards documents, such as, by way of example government defined standards, standards defined by standards organizations, standards defined by corporations, and/or the like. Such standards may include NIST (National Institute of Standards and Technology) standards that specify security and privacy control groups and that outlines controls for Controlled Unclassified Information (CUI) resident in nonfederal systems. By way of example, a control may specify procedures, mechanisms, and/or measures that limit access to content or applications to authorized persons or authorized applications. Content may further include a handbook provides that provides guidance on implementing the NIST standard (or other standards).

By way of further example, standards may include CIS (Center for Internet Security) standards that provide critical security controls comprising recommended sets of actions for cyber defense that provide specific and actionable ways to stop cyber/software attacks. The CIS controls include secure hardware and software configurations, malware defenses, data recovery, account monitoring and control, incident response and management, penetration tests and Red Team exercises.

The foregoing standards and/or other standards may have corresponding controls identified, defined, and resolved using "Most Critical Path at Least Cost" (MCP@LC) methodology.

A standards' controls may fall into one of the following categories: Management, Operational, and Technical. Based on the type, the control is resolved using the aforementioned MCP@LC methodology which provides a policy element that meets the criteria as set forth in the corresponding standard, and then will possibly have an operational process, and/or a technical solution; again, based on the type of control and the results of the application of the MCP@LC methodology.

Utilizing systems and processes described herein, controls, terms, and/or solutions are "wiki-linked" in a mesh fashion. Advantageously, "back-linking" (incoming linking) is optionally provided. For example, activation of a backlink on a given subject/control page may cause the system to locate and render every other page, control, or concept that is linked to the current control. Such back-linking enables a user to view and grasp the "whole picture" as it relates to the subject/control the user is interested in. By way of example, if a person is dealing with a concept/control, such as multi-factor authentication, which has its own page, with a single click of a backlink, the system will access and present every other page, control, or concept that is linked to the multi-factor authentication control. As will be described, such backlinks may be presented in ordered fashion to enable a user to more quickly locate and activate a desired backlink.

As similarly discussed above, the system may host a site including an index of assessment standards. By way of non-limiting example, the assessment standards may include some or all of the following: NIST 171, a Boeing CSQ (Cybersecurity Questionnaire), and/or CIS (Center for Internet Security) v7. Optionally, other indexes may be provided, organized by control type (e.g., management controls index, operational controls index, technical controls index, and/or other indexes).

Content below the index can be mutually interlinked within the interesting/relevant standard, and concepts, definitions and other global items may be linked within a given standard. The index may optionally be ordered alphabetically, where numbered entries are listed first (e.g., in ascending or descending order), and then alphabetically titled entries are listed in a-to-z or z-to-a.

An example page may include some or all of the following:

The control ID per the relevant standard
The verbiage of the control ID
Supplemental guidance per the standard publisher (e.g., NIST, CIS, etc.).
MCP@LC methodology
Supplemental guidance from the wiki creator/editor
Template Policy Element from the wiki creator/editor
Template Procedure Element from the wiki creator/editor
Template Implementation Plan from the wiki creator/editor
Template Technical Guidance (optionally vendor)
"Wiki Creator/Editor Only" area which can only be seen and/or edited by the authorized wiki creator/editor group members. Optionally, the Creator/Editor area includes a field configured to receive user text, where a user may be enabled to format the appearance of content using a text-based syntax. Optionally, edit controls may be provided that enable a user to format text (e.g., select a font, a font size, perform underlining, bolding, strikeouts, and the like on text), and presents the formatted text using what-you-see-is-what-you-get (WYSIWYG) presentation.

Optionally, certain elevated functions are only accessible by authorized administrators that have accounts with associated permissions indicated therein. Similar access control may be employed with other groups as well so that a particular subset of users can see differing content based on their interests (e.g., subjects/topics, pages, or collections of pages that the user has subscribed to) and/or authorizations.

Optionally, links/access control place in page may be optimized for use on a handheld, touch screen device, such as a tablet computer or mobile phone. For example, links to the most used linked-to-documents may be presented on the right side of the page (to be easily accessible to the thumb of the right hand (where the thumb may touch a link to select it), which is typically the dominant hand) while links to the less used linked-to-documents may be presented on the left side of the page (to be easily accessible to the thumb of the left hand, which is typically the non-dominant hand). Other links may be presented towards the top of bottom of the page. In addition, terms within the page may be linked to relevant documents.

Page Construct

Optionally, a given page is laid out in a logical fashion based on "Working the problem" in a waterfall approach (relatively linear sequential).

Following is an example sample control page for the NIST 800-171 standard:

A. Structure:
1. NIST SP800-171r1 Control Verbiage
2. Most Critical Path at Least Cost (MCP@LC)
3. Sample Organizational Policy
4. Sample Organizational Procedure
5. Sample Implementation Statement
6. Wiki creator/editor Only Area which has intellectual property such as technical solution, costs, pros/cons, deployment methodology, prerequisites, dependencies, and other information that the Wiki creator/editor consultant use to better provide services to the client.
7. NIST HB-162 (Handbook) Verbiage
8. NIST SP800-171A Verbiage (Where applicable)
9. NIST SP800-160 Volumes 1 and 2 Verbiage (Where applicable).

B. Other standards may be implemented with a similar flow and may optionally contain items 1-6 respective of their standards, and corresponding relevant context verbiage items 7-9.

C. Navigation controls. Navigation is configured to be performed very efficiently and intuitively. For example, a given electronic page may include multiple navigation controls, such as previous page, next page, and such controls may be presented contextually. For example, the presented navigation controls may be dynamically changed based at least in part on the adjacent presented requirements and/or other content. By way of illustration, the presented navigation controls may be dynamically changed to reflect the adjacent requirements entries for the visible/displayed requirement/control page currently being presented. In addition or instead, the presented navigation controls may be dynamically changed to reflect the hierarchical height of a presented menu, adjacent standards entries, and/or lateral level menu items. Optionally, a given page or other document may include header or logo that is linked to a home page to enable a user to quickly be reoriented if lost within the site. Optionally, one or more sets of navigations links may be positioned in one or more areas to logically arrange the links. A set of links may correspond to a table of contents or index for the site.

D. "Backlinks" navigation is optionally provided on a given page. For example, hovering over or clicking on a backlinks control may cause page identifiers (e.g., tiles and/or section numbers) of all pages that directly link to the viewed page to be presented, which the page identifiers acts as links to the corresponding pages (so that if a user activates a backlink the corresponding document is navigated to and presented to the user). Different pages may have different backlinks, and hence backlinks may dynamically change with the viewed page, and hence the displayed backlinks may dynamically change.

E. Technical concepts may be "wiki-linked" (e.g., internally linked so that a technical concept provided on a given page may be linked to another page within the site) in a mesh fashion. Controls may be mesh-linked in similar way. For example, controls that are similar (e.g., perform a similar function) and have either a direct relationship to the page that is being viewed, or a direct relationship to a topic that may need additional information to further clarify the concept being addressed may be mutually linked.

F. Search can be standards filtered, other filter(s) or global to the site.

G. MANUFACTORG=The name of the relevant Manufacturing Organization and is created for use within the instrument so that advantageously, by having this single reference to the relevant Manufacturing Organization name, documentation creation may be more rapidly and easily updated to recite the relevant Manufacturing Organization name using a global find and replace operation, where the term MANUFACTORG in the document itself (which may be used as a placeholder) may be automatically replaced with the corresponding actual name of the relevant manufacturing organization.

As noted above, a given page may include edit controls that enable a user to edit the page content. Optionally, an authentication token (e.g., a user identifier, a password, a biometric input (e.g., facial recognition, fingerprint recognition, voice recognition, etc.) may need to be submitted and inspected to determine whether the user is authorized (e.g., by modification/edit control rules or a site administrator) to make such edits. A user may be enabled to format the appearance of content using a text-based syntax and/or using what-you-see-is-what-you-get (WYSIWYG) tools.

Certain aspect of the disclosure will now be discussed with reference to the figures.

Referring to FIG. 1, an example content management system 100 may communicate over a network 101 with a plurality of user systems 102-1 . . . 102-$n$ and 104-1 . . . 104-$n$. The content management system 100 may interact with the user systems 102, 104 via a client server configuration. The communications may be encrypted. For example, AES-256 or SHA-384 hashes may be used. Counter Mode Cipher Block Chaining Message Authentication Code Protocol (CCMP) may be utilized with respect to performing encrypted communication. Optionally, Simultaneous Authentication of Equals (SAE) may be utilized to provide a secure password-based authentication and password-authenticated key exchange.

The content management system 100 may comprise a hosted computing environment that includes a collection of physical computing resources that may be remotely accessible and may be rapidly provisioned as needed (sometimes referred to as a "cloud" computing environment). The content management system 100 may also include a data store. The data store is optionally a hosted storage environment that includes a collection of physical data storage devices that may be remotely accessible and may be rapidly provisioned as needed (sometimes referred to as "cloud" storage).

The plurality of user systems 102-1 . . . 102-$n$ and 104-1 . . . 104-$n$ may include standalone computers (e.g., desktop, laptop, tablet, smart phone, or other computer device), a centralized computer system, and/or a cloud computing system. The user systems 102-1 . . . 102-$n$ may be associated with users that enter and/or manage the content (e.g., the standards documents) and user systems 104-1 . . . 104-$n$ may be associated with users that access the content and other information provided by the users of the user systems 102-1 . . . 102-$n$. Of course a given user may be an administrator that enters, edits, or manages content and also a user of the content.

Optionally, rather than using the client-server architecture illustrated in FIG. 1, a standalone computer system may be utilized with an installed application (e.g., a wiki-engine or other content management application) configured to perform functions described herein locally. Such standalone computer system solution may or may not connect to the system 100 for storage purposes. Optionally, the standalone computer system have downloaded some or all of site content as described elsewhere herein.

For example, the content management system 100 described herein provides decentralized control and access to needed information and enables content to be disseminated and updated rapidly. Outdated or erroneous data may be removed rapidly to ensure that the disseminated data is current.

Figure 2:
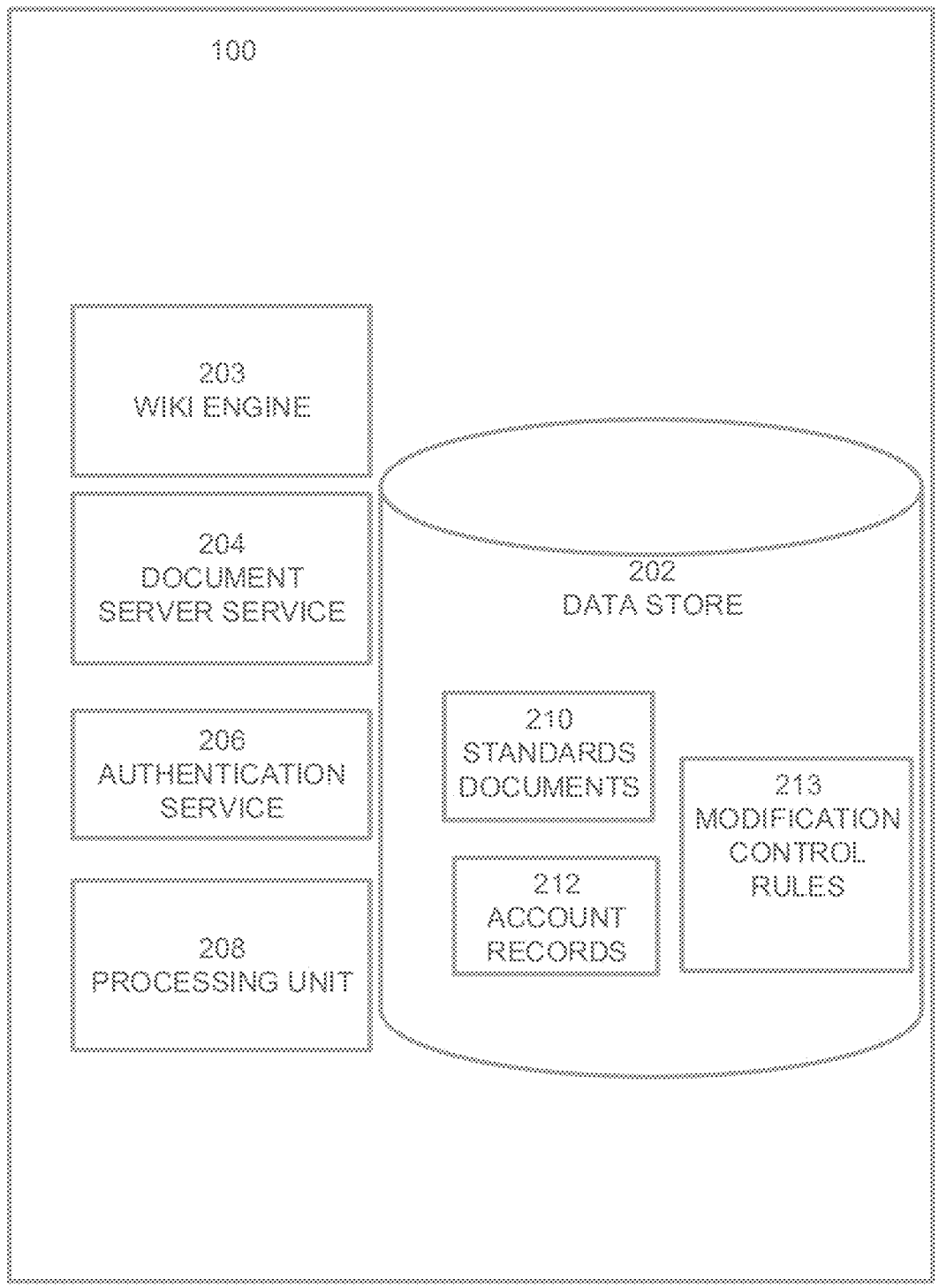
FIG. 2 illustrates an example architecture of a content management system.

With reference to FIG. 2, an example implementation of the content management system 100 is illustrated. Referring to FIG. 2, the content management system 100 may include a data store 202 (which may include multiple data stores comprising databases and/or files storing the content and/or data described herein), a wiki engine 203 (which may include a search engine configured to process user searches), a document server service 204, and/or an authentication service 206. A processing unit 208 is used to execute programmatic instructions stored in memory to perform the various functions discussed herein. As noted above, the content management system 100 (optionally including the data store 202) may be cloud-based.

Thus, for example, the data store 202 may store cross-linked standards documents (e.g., HTML versions, PDF versions, and/or other versions of documents) 210, account records 212 (which may include accounts for users, an indication as to what access rights they have, what edit rights they have, etc.), video and/or audio files, and/or the like. Thus, documents in different, heterogeneous formats may still be cross-inked in a mesh of documents using the system 200. The data store 202 may also store modification access rules 213 that may be utilized to determine what documents may be modified and which documents are to be static, and which users are authorized to edit which documents, add links, and/or remove links.

A given database may be a relational database (e.g., an SQL database, such as MYSQL) or a non-relational database (a nonSQL database, such as NoSQL). For example, a relational database may advantageously use the same uniform language (e.g., DDL) for different user roles (developer, user, administrator, etc.), may use a standardized language for different relational database management systems, may use an advanced and non-structural querying language, and may comply with ACID principles (atomicity, consistency, isolation, durability), thus ensuring stability, security, and predictability both of the entire database and each transaction. A nonSQL database may be used rather than an SQL database as it better scales out horizontally across distributed systems and so can handle a large number of transactions (e.g., millions of transactions at a time). Further, a nonSQL database may be schema-free and so better utilized with unstructured and semi-structured data. Thus the selection of the database technology may be based on the particular use scenario (e.g., the need for stability and uniformity offered by SQL databases v. the need to process large amounts of unstructured and semi-structured data as provided by a nonSQL database).

The wiki engine 203 may enable the creation and editing of various pages or other entries, with the creation of internal crosslinks and backlinks. The wiki engine 203 optionally enables the wiki content to be collaboratively generated by multiple users. The wiki engine 203 optionally performs version tracking, and maintains, and provides for viewing, a record of what edits were made, a date/time stamp associated with the edits, and the identity of the user that made the edits. The wiki engine 203 optionally enables the creation and maintenance of blogs to further facilitate dissemination of information in a less formal matter via posts. Optionally, the post may be ordered and displayed in reverse chronological order, where the most recent post may be displayed first, at the beginning of the page containing the blog.

The document server service 204 may be used to serve documents (e.g., wiki-entries) to user systems 102 and user systems 104, as appropriate or requested.

The authentication service 206 may be used to authenticate a user and/or application that is attempting to access and/or edit content. For example, the authentication service 206 may be configured to uniquely and securely identify an application of a user computer 102 accessing the content management system 100, and identify an associated user account, prior to granting the user system 102 with the corresponding services described herein. If the application cannot authenticate itself properly and successfully, or if the user account cannot be found or is expired, an authentication error results and an electronic notification (e.g., a generated sound, a text notification, an image notification, etc.) may be provided to the user of the user system 102 and/or an administrator of the content management system. In order to authenticate a user and application, the content management system 100 may need to receive via the user system 102 a valid UserID and password and/or biometric confirmation as to the user's identity.

Optionally, the content management system 100 may enable a user to subscribe to specific pages, sets of pages, and/or subjects. For example, a subscription control may be located on a given page, which activated causes a corresponding subscription record to be recorded in the data store 202 in an account of the user. In response to detecting a modification (e.g., an addition, deletion, or edit) of a page, the content management system 100 may determine (e.g., via user accounts) which users have subscribed to the edited page by inspecting user accounts. A notification may be transmitted to respective electronic destinations associated with the subscribers. For example, a notification may be sent via an email address, short messaging service message or via an application notification hosted on a user device. By way of example, the application hosted on a user device may be dedicated to accessing and navigating the cross-linked data. The notification may include a link to a subscribed to page, wherein activation of the link may navigate a browser or dedicated app on the user device to the modified subscribed-to page.

Optionally, a user may be enabled to download a local copy of selected portions (e.g., subscribed pages, sets of pages, or sections) or all of the mesh-linked site to a user device for later access. This may enable a user to access such site portions even in the absence of network access. A user account record may optionally be updated to indicate the portions hat have been downloaded to the user device. In response to the content management system 100 detecting an edit to a portion of the site (e.g., one or more pages), the system may determine which users or user devices have downloaded the edited portion, and push/synchronize the revised/edited portion to the user devices. Optionally, the content management system 100 may publish the availability of the revised/edited portions and the user devices may download the revised/edited portions that correspond to those previously downloaded to the user devices.

As noted elsewhere herein, a user may be enabled to edit a given page. Optionally, the user may limit the user's edits to being viewed only by the user so as to prevent other users from accessing the edits. Optionally, one or more rules may be established (e.g., by an administrator) and stored in a rules data store. The rules may specify which users may modify/edit a given page, set of pages, or sections, and rules may specify whether a given user's edits may be viewed by other users or not. Optionally, a rule may specify that a given user's edits may be viewed by a selected set of other users.

Figure 4:
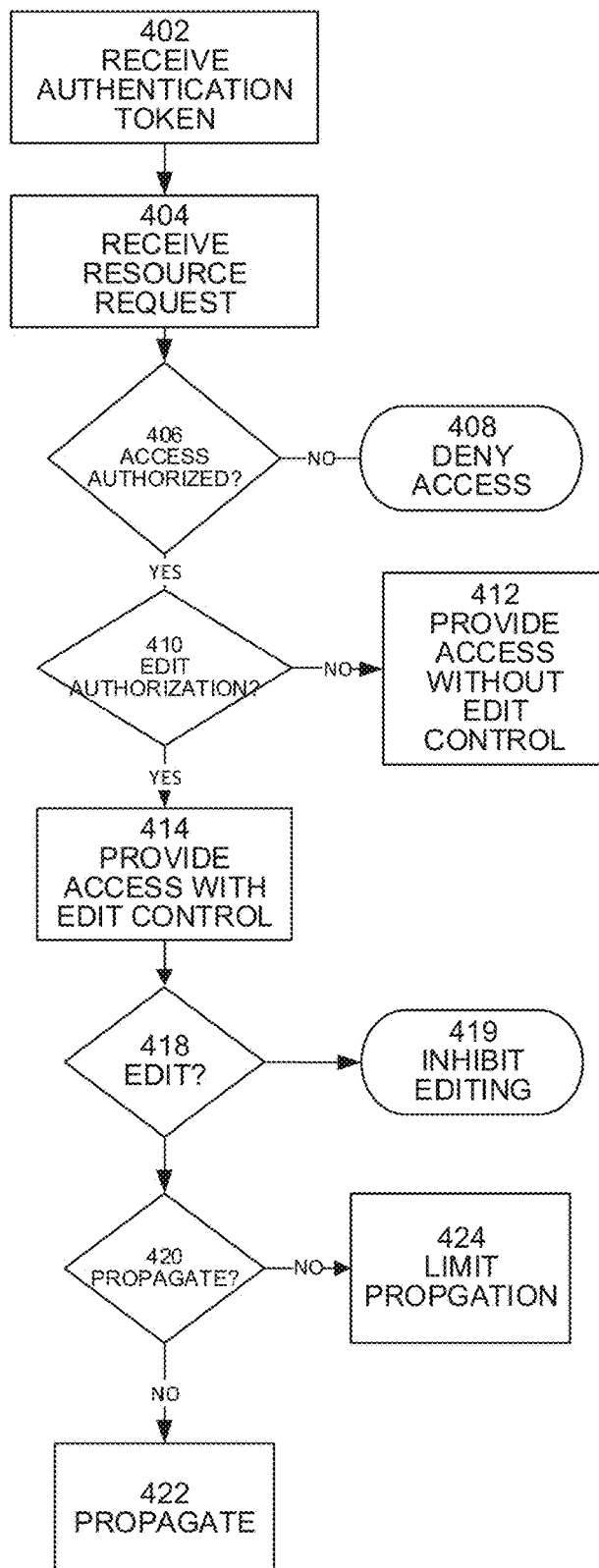
FIGS. 4-5 illustrate example processes.

FIG. 4 illustrates an example process of accessing and editing a page. At block 402, an authentication token is received from a user device. The authentication token may include a password, a user identifier, a confirmation that the user was authenticated using one or more biometric identity verifications (e.g., fingerprint recognition, facial recognition, pupil recognition, voice recognition, and/or the like), and/or a unique identifier associated with an application instantiated on a user device. Optionally, multifactor authentication may be utilized. For example, in response to receiving a first user authentication token, a notification (optionally including a confirmation link) may be transmitted to a destination associated with the user (e.g., an email address, a messaging service address, an application hosted on the user device, etc.), where user activation of the link needs to be detected by the content management system in order for the user to be authenticated.

If the user and/or user device are authenticated, the process may proceed to block 404, and a resource request is received from the user device. For example, the resource request may be in the form of a request including a resource locator (e.g., a uniform resource locator received from a browser or dedicated application hosted on the user device).

Optionally, communications from the user device to the content management system may be encrypted. The client (e.g., the user device browser) may initiate a handshaking message to the content management system. The handshaking message may identify the cipher suites supported by the client and other cryptographic information (e.g., the maximum supported version of transport layer security or secure sockets layer, the client's order of preference). The handshaking message may optionally identify data compression methods supported by the user device. The handshaking message may include a random byte string that may be used in generating encryption keys.

The content management system may respond to the client with a handshaking signal which identifies the cipher suite suit and encryption version (selected from those identified in the client handshaking message) that will be used. The content management system message may also include a session ID and another random byte string. The content management system may additionally transmit its digital certificate. The content management system may also transmit a client certificate request that identifies the types of certificates supported and the Distinguished Names of acceptable Certification Authorities (CAs), which the client may verify.

The random byte string transmitted by the client to the content management system may be utilized by both the client and the content management system to generate a secret key that may be used for encrypting subsequent message data. Asymmetric encryption may be utilized to generate a shared secret key. The random byte string itself may be encrypted with the content management system's public key.

By way of further example, a given item of data may encrypted using an AES-128 key or public key cryptography/asymmetrical cryptography. If symmetric encryption is used, than the encryption key and the decryption key may be the same key. If public key cryptography/asymmetrical cryptography is used, then a public key may be used to encrypt the data and a private key may be generated to decrypt the data.

At block 406, a determination is made, based on a user account record associated with the authentication token, whether the user is authorized to access the requested source. If the user is not authorized to access the requested resource, at block 408, access may be denied, and a denial notification is caused to be transmitted for presentation to the user.

If the user is determined to be authorized to access the requested resource, a determination may be made as to whether the user is authorized to edit the resource, using an authorization indication stored in the user account. If a determination is made that the user is not authorized to edit the resource, the requested resource is transmitted to the user device without an edit control and/or field being displayed, or with the edit controlled displayed but disabled (where the disabling of the edit control is optionally visually indicated (e.g., by being greyed out and/or with a corresponding text message or icon) to thereby inhibit user edits.

If a determination is made that the user is authorized to edit the resource, the requested resource is transmitted to the user device with an edit control and/or edit field being displayed and enabled. Optionally, formatting controls (e.g., font selection, font size, justification, line spacing, text color, etc.) may be provided to enable the user to format the edited content.

At block 418, a determination is made as to whether the user has activated the edit control and edited the resource. If the user has saved and/or published the edited resource (e.g., by activating save/publish control), a determination may be made at block 420 as whether the edit is to be propagated to other users. For example, the determination may be made based on rules established by an administrator user and/or on an instruction from the user to share the edit with all users or with specific users or specific teams of users (e.g., a project team of whom the user is a member).

If a determination is made that the edited resource is not to be propagated to other users, the process may proceed to block 424, and propagation may be limited to only the user who created the edit so that only that user has access to the edit (although certain administrators may have access to the edited resource for administrative purposes).

Figure 5:
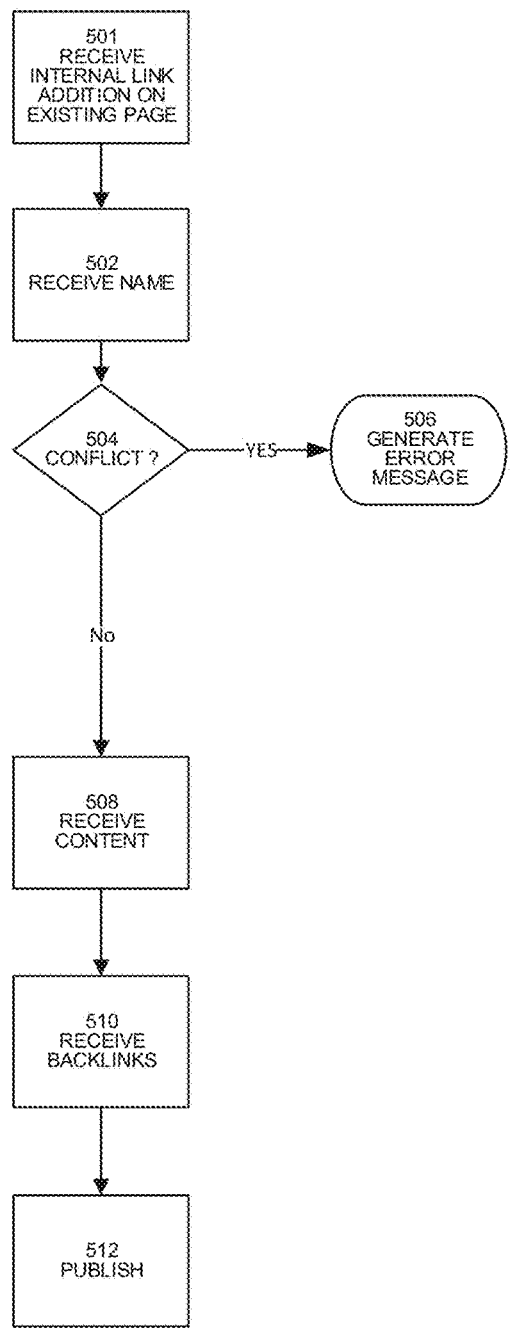

If a determination is made that the edited resource is to be propagated to other users, the process may proceed to block 422, and the edited resources may be propagated (via a push or pull of the edited resource by the respective users' devices) so that other permitted users may view the edited resource FIG. 5 illustrates an example process for generating a mesh-linked page. In this example, a first page already exists and a user is adding a new page linked to the first page. A block 501, a user activation of a "create page" link (or other control) in an existing page is received and a link (e.g., a uniform resource locator) to the new page is generated. A name may be automatically generated for the new linked page. At block 502, the user may name (or rename if previously automatically named) the new linked page. At block 504, a determination may be made as to whether the user-provided name conflicts with an already existing name. If a conflict exists, the process may proceed to block 506, and a conflict error message is generated for presentation to the user. Optionally, the user is provided the option to select another name. If a name conflict does not exist, the process proceeds to block 508, and user content is received, optionally in associated with formatting instructions. At block 510, one more backlinks may be added to the page by the user or the system. At block 512, in a response to a user instruction, the new page may be published to be accessed by permitted users.

Certain example user interfaces will now be described. The example user interfaces may be rendered on the display of a user device.

Figure 3A:
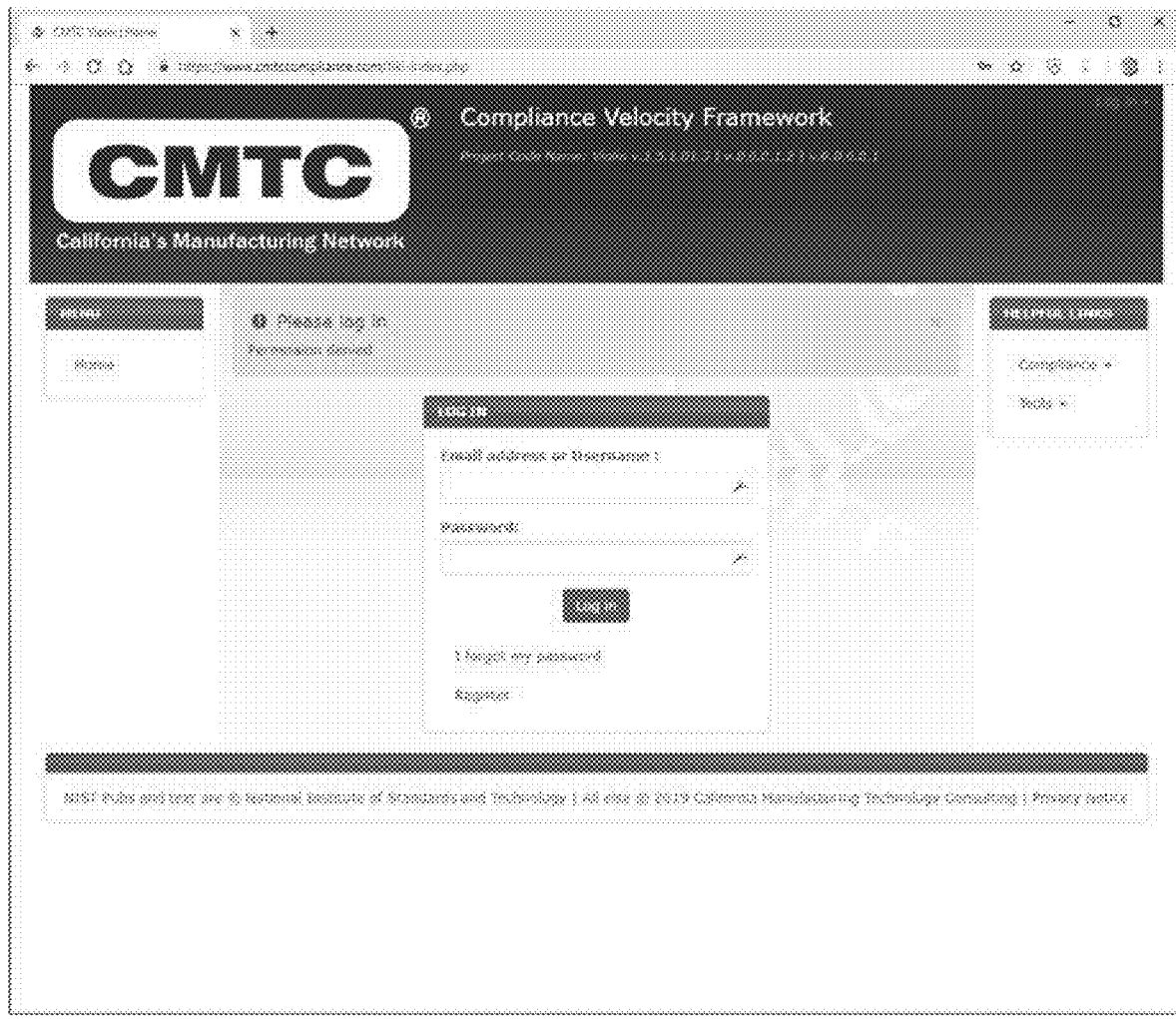
FIGS. 3A-3D illustrate example user interfaces for viewing and editing a document and data.

FIG. 3A illustrates an example log-in user interface via which a user can submit a user identifier (e.g., a user name or email address) and a password. As discussed above, if the user is successfully authenticated, the associated user access/edit permissions may be determined from a corresponding user account. The user may then be provided with access to corresponding interfaces and data, such as the interfaces and data described below. The user interface further includes links to frequently used links, such as links to frequently used reference documents (e.g., compliance documents, which may be selected via a drop down menu) and tools (which may be selected via a drop down menu).

For example, in the context of information technology, multiple relevant tools may be linked-to, enabling the user to select a desired tool. An example tool may be the Cyber Security Evaluation Tool (CSET®) from the Department of Homeland Security (DHS) that assists organizations in protecting their cyber assets. CSET is a software application (which may be installed on a user computer) that guides users through a step-by-step process to assess their control system and information technology network security practices against recognized industry standards. The CSET may generate a prioritized list of recommendations for improving the cybersecurity posture of the organization's enterprise and industrial control cyber systems. The CSET tool derives the recommendations from a database of cybersecurity standards, guidelines, and practices. A given recommendation is linked to a set of actions that can be applied to enhance cybersecurity controls. Optionally, the page is agnostic regarding the linked-to tools so that multiple tools may be linked-to for the same use case (e.g., cybersecurity) and users can evaluate each too and determine the perceived best fit for their specific security use cases. The user interface may include a header associated with a link to a home page of the wiki site.

Figure 3B:
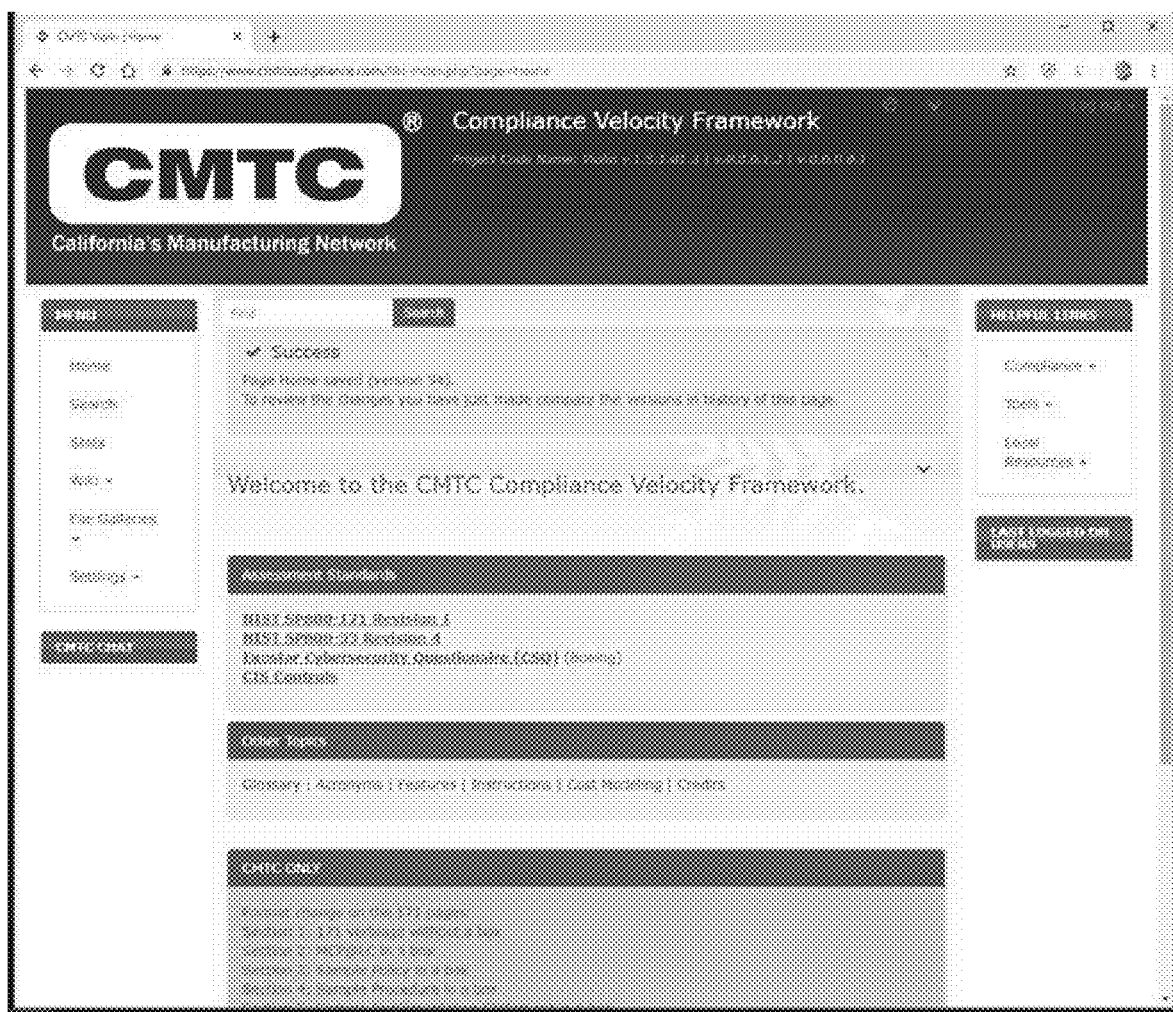

FIG. 3B illustrates an example compliance framework user interface. The example compliance framework user interface incudes a search field configured to receive one or more text search terms from a user. A search engine may identify content corresponding to the search terms and present the corresponding content in ranked order. In addition, an interface is provided via which the user can access and review changes the user has made, and compare historical versions of the page. An assessment standards area includes links to various named assessment standards. An "other topics" area includes links to other topics such as a glossary, acronyms, features, instructions, cost modeling, and credits. A "CMTC Only area" provide links and information to which only group members of the wiki management team have access.

The glossary may include a lexicon of terms and definitions that pertain to a certain subject, such as terms found in the assessment standards. Optionally, where a term found in the glossary is used in a document included in the wiki site, the term may be highlighted in the document and may be linked to the corresponding definition in the glossary. If a user clicks on or hovers a pointer/cursor over the term in the document, the corresponding glossary entry may be presented to the user (e.g., via a pop-up window or by navigating the user browser to the corresponding glossary page). The glossary may include enhanced navigational tools, such as an alphabetical index, where in response to a user selecting a letter, the glossary will filter the glossary entries to only those terms that begin with the selected letter.

Optionally, the glossary terms may be organized in sets corresponding to the documents in which they are found, as most searched, or most viewed to enable the user to quickly locate terms the user is interested in. Optionally, a search field is provided via which the user can enter the term for which the user wants to view the glossary entry, where the query may be provided to a search engine which may in turn provide the matching glossary terms for presentation to the user.

Acronyms may be formed from the initial letter or letters of each of the successive parts or major parts of a compound acronym. Acronyms are commonly used in standards and reference documents, however the meaning of such acronyms may be obscure to users. The acronym reference data store may include a lexicon of acronyms and the compound acronyms corresponding to the acronym that pertain to a certain subject, such as acronyms found in the assessment standards.

Optionally, where an acronym found in the acronym reference data store is used in a document included in the wiki site, the acronym may be highlighted in the document and may be linked to the corresponding compound acronyms in the acronym reference data store. If a user clicks on or hovers a pointer/cursor over the acronym in the document, the corresponding acronym reference data store entry may be presented to the user (e.g., via a pop-up window or by navigating the user browser to the corresponding acronym reference data store page). The acronym reference data store may include enhanced navigational tools, such as an alphabetical index, where in response to a user selecting a letter, the acronym reference data store will filter the acronym reference data store entries to only those acronyms that begin with the selected letter. Optionally, the acronym reference data store acronyms may be organized in sets corresponding to the documents in which they are found, as most searched, or most viewed to enable the user to quickly locate acronyms the user is interested in. Optionally, a search field is provided via which the user can enter the acronym for which the user wants to view the acronym reference data store entry, where the query may be provided to a search engine which may in turn provide the matching acronym reference data store acronyms for presentation to the user.

Cost modeling may include a software model that is based on identified manufacturing steps for a given product, where factory operating costs may be broken down by time, and may include labor costs, overhead costs, real estate costs, computer processing costs, and parts and materials costs. Certain information may be obtained from a Computer Aided Design system. Such information obtained from the CAD system may include data such as size, weight, number of components, component size, surface treatment, complexity, component tolerances, and/or the like.

An edit history section (which optionally is only provided for display to an authorized administrator as determined by the corresponding administrator's authentication token) may display a scrollable list of edits made to various sections of the wiki site.

A menu area provides links to a "home" page, a detailed search menu, a statistics page, a wiki drop down menu (e.g., which displays alphanumeric links to various sections/pages of the wiki site), a file galleries drop down menu (e.g., which displays a navigable interface of available files for viewing/downloading), and a settings drop down menu. The available settings may be dynamically adjusted based on the user's permissions (where the permissions may be role-based, where different access rights may be provided for different roles). For example, the settings may enable a user to specify certain website preferences, such as accessibility, number of requirements or control entries displayed on a page, whether certain page areas/menus are to be displayed (e.g., tools, help links, compliance links, local resources links, etc.), and/or the like. Optionally, a user with administrator permissions may be enabled to administer the site via the settings and/or control what settings end users can access. The statistics page may display system generated statistics, such as how many times a given page has been accessed and viewed within a specified time frame, how many times a user shared a page with another user, the average or median time users have viewed a given page or document, and/or other such statistics.

The header may also link to the home page so that when a user clicks on the header, the user's browser navigates to the wiki home page. A chat control provides access to a chat user interface via which a user may engage in a real time text chat with support personnel. The chat may be a text, voice, and/or video chat. Optionally, a chat transcript may be recorded and sored for later access by one or both members of the chat.

Figure 3C:
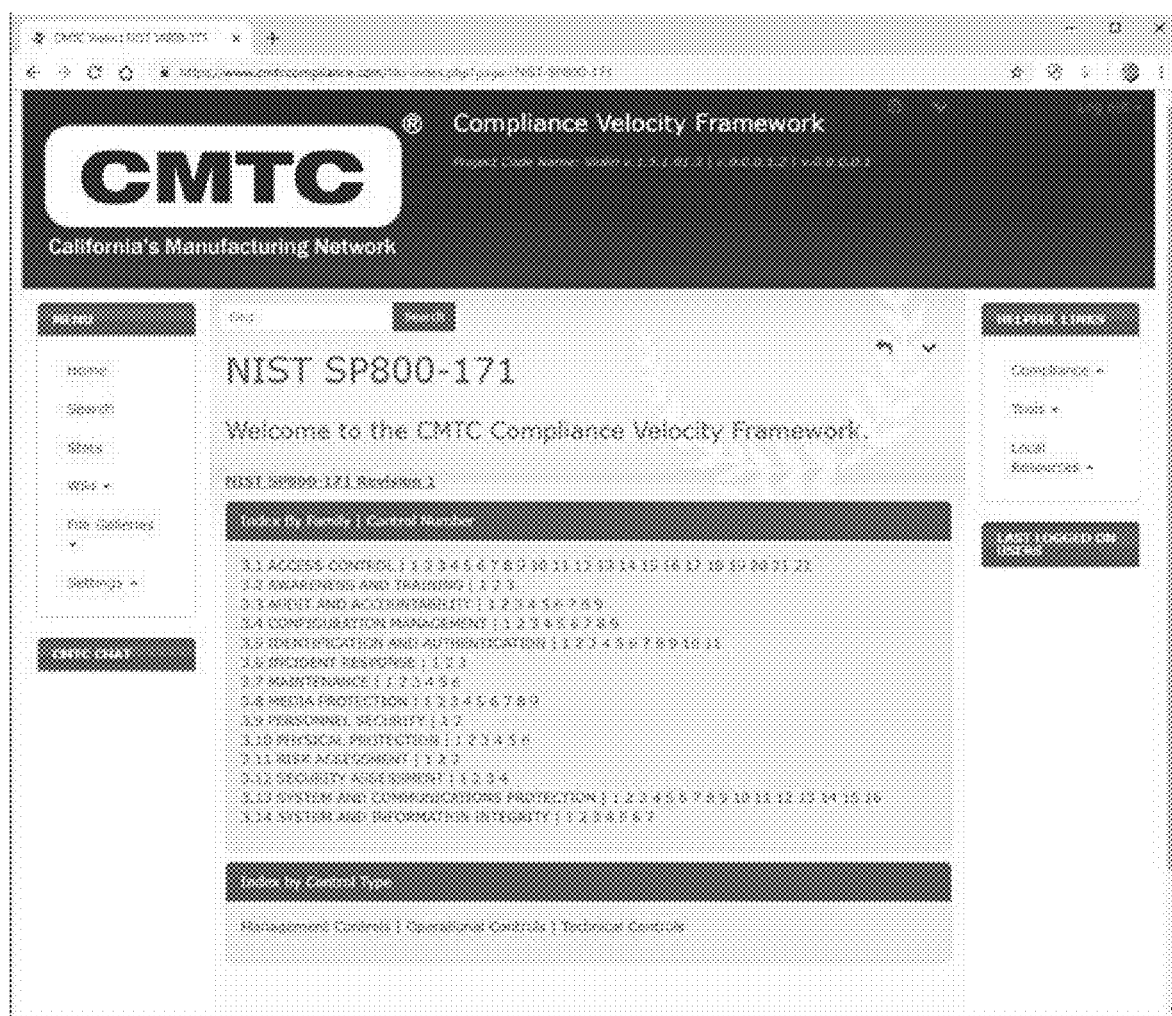

In response to a user clicking on a link in the assessment standards area, the example user interface illustrated in FIG. 3C may be accessed and rendered. The example user interface may include a link to the entire standards document. The user interface may include an "index by family—control number" area that comprises ordered links (with corresponding control numbers) to various sections of the standard. The links may include the section names and/or other descriptive names. An "index by control type" area may provide links to indexes of different control types (e.g., management controls, operational controls, technical controls).

Figure 3D:
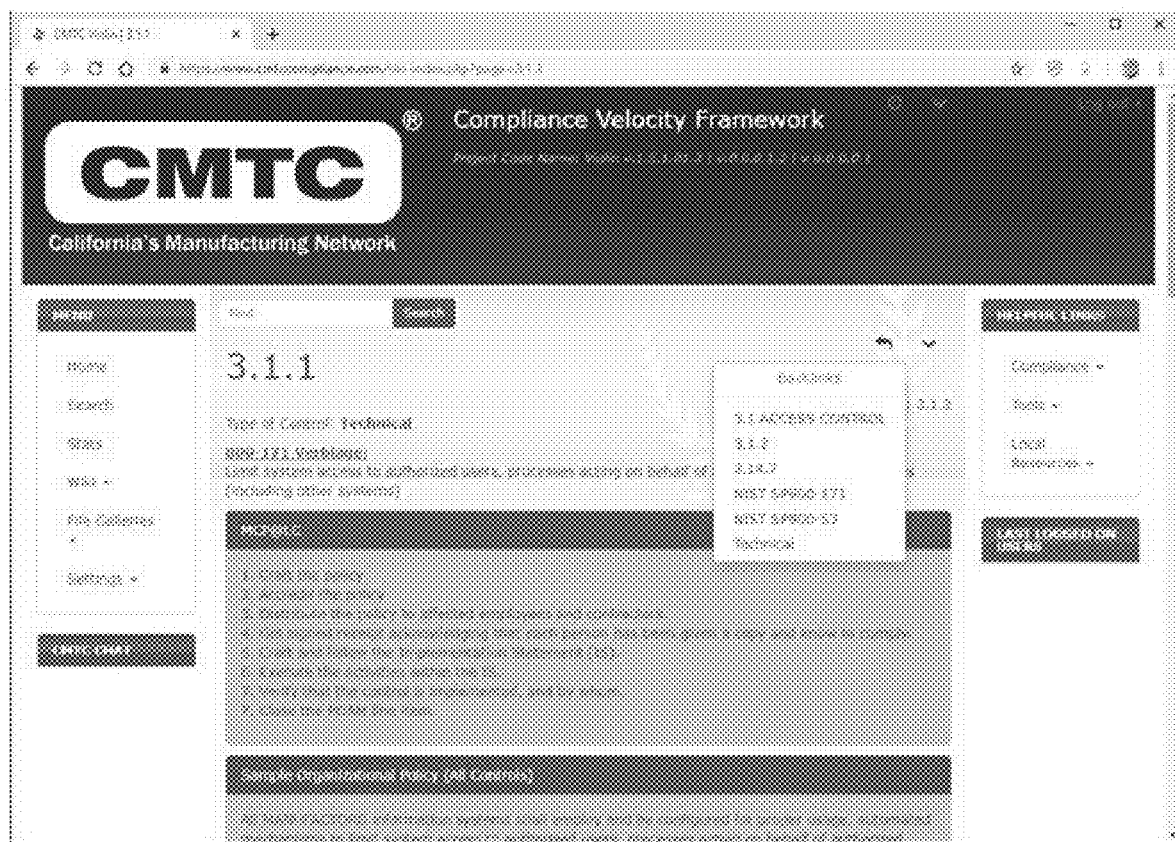

In response to a user selecting the "technical control" link (Section 3.1) in the "index by family—control number" area of the user interface illustrated in FIG. 3C, the example user interface illustrated in FIG. 3D may be accessed and rendered. Advantageously, the user interface is laid out in a logical fashion based on "Working the problem" in a waterfall approach. The user interface lists the control being accessed ("technical control"), includes a link to a corresponding document, and includes corresponding control verbiage (e.g., instructions regarding corresponding procedures, mechanisms, and/or measures). A "Most Critical Path at Least Cost" (MCP@LC) area include procedure steps to accomplish the most critical path at least cost. A "sample organizational policy (all controls)" area displays an example organizational policy, including corresponding controls. Activation of a backlinks control causes backlinks to the displayed user interface page to be displayed. Optionally, the backlinks may be presented in alphanumerical order, with the backlinks to a numbered section of a document (e.g., a reference document) displayed in descending order (or ascending order) and the alphabetically titled documents are displayed in descending order (or ascending order).

Thus, systems and methods for content management are described. For example, methods and systems for mesh-linking content, controlling access rights, controlling and tracking edits, enhancing manufacturing processes, and network security are described. are described. The disclosed content management system provides decentralized control and access to needed information and enables content to be disseminated and updated rapidly.

Terminology

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Unless the context clearly requires otherwise, throughout the description, the words "comprise," "comprising," and the like are to be construed in an inclusive sense, as opposed to an exclusive or exhaustive sense, i.e., in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words using the singular or plural number may also include the plural or singular number respectively. The word "or" in reference to a list of two or more items, covers all of the following interpretations of the word: any one of the items in the list, all of the items in the list, and any combination of the items in the list. Likewise the term "and/or" in reference to a list of two or more items, covers all of the following interpretations of the word: any one of the items in the list, all of the items in the list, and any combination of the items in the list.

In some embodiments, certain operations, acts, events, or functions of any of the algorithms described herein can be performed in a different sequence, can be added, merged, or left out altogether (e.g., not all are necessary for the practice of the algorithms). In certain embodiments, operations, acts, functions, or events can be performed concurrently, e.g., through multi-threaded processing, interrupt processing, or multiple processors or processor cores or on other parallel architectures, rather than sequentially.

Systems and modules described herein may comprise software, firmware, hardware, or any combination(s) of software, firmware, or hardware suitable for the purposes described. Software and other modules may reside and execute on servers, workstations, personal computers, computerized tablets, PDAs, and other computing devices suitable for the purposes described herein. Software and other modules may be accessible via local computer memory, via a network, via a browser, or via other means suitable for the purposes described herein. Data structures described herein may comprise computer files, variables, programming arrays, programming structures, or any electronic information storage schemes or methods, or any combinations thereof, suitable for the purposes described herein. User interface elements described herein may comprise elements from graphical user interfaces, interactive voice response, command line interfaces, and other suitable interfaces.

Further, processing of the various components of the illustrated systems can be distributed across multiple machines, networks, and other computing resources. Two or more components of a system can be combined into fewer components. Various components of the illustrated systems can be implemented in one or more virtual machines, rather than in dedicated computer hardware systems and/or computing devices.

Likewise, the data repositories shown can represent physical and/or logical data storage, including, e.g., storage area networks or other distributed storage systems. Moreover, in some embodiments the connections between the components shown represent possible paths of data flow, rather than actual connections between hardware. While some examples of possible connections are shown, any of the subset of the components shown can communicate with any other subset of components in various implementations.

Embodiments are also described above with reference to flow chart illustrations and/or block diagrams of methods, apparatus (systems) and computer program products. Each block of the flow chart illustrations and/or block diagrams, and combinations of blocks in the flow chart illustrations and/or block diagrams, may be implemented by computer program instructions. Such instructions may be provided to a processor of a general purpose computer, special purpose computer, specially-equipped computer (e.g., comprising a high-performance database server, a graphics subsystem, etc.) or other programmable data processing apparatus to produce a machine, such that the instructions, which execute via the processor(s) of the computer or other programmable data processing apparatus, create means for implementing the acts specified in the flow chart and/or block diagram block or blocks. These computer program instructions may also be stored in a non-transitory computer-readable memory that can direct a computer or other programmable data processing apparatus to operate in a particular manner, such that the instructions stored in the computer-readable memory produce an article of manufacture including instruction means which implement the acts specified in the flow chart and/or block diagram block or blocks. The computer program instructions may also be loaded to a computing device or other programmable data processing apparatus to cause operations to be performed on the computing device or other programmable apparatus to produce a computer implemented process such that the instructions which execute on the computing device or other programmable apparatus provide steps for implementing the acts specified in the flow chart and/or block diagram block or blocks.

While the phrase "click" may be used with respect to a user selecting a control, menu selection, or the like, other user inputs may be used, such as voice commands, text entry, gestures, etc. User inputs may, by way of example, be provided via an interface, such as via text fields, wherein a user enters text, and/or via a menu selection (e.g., a drop down menu, a list or other arrangement via which the user can check via a check box or otherwise make a selection or selections, a group of individually selectable icons, etc.). When the user provides an input or activates a control, a corresponding computing system may perform the corresponding operation. Some or all of the data, inputs and instructions provided by a user may optionally be stored in a system data store (e.g., a database), from which the system may access and retrieve such data, inputs, and instructions. The notifications and user interfaces described herein may be provided via a Web page, a dedicated or non-dedicated phone application, computer application, a short messaging service message (e.g., SMS, MMS, etc.), instant messaging, email, push notification, audibly, and/or otherwise.

The user terminals described herein may be in the form of a mobile communication device (e.g., a cell phone), laptop, tablet computer, interactive television, game console, media streaming device, head-wearable display, networked watch, etc. The user terminals may optionally include displays, user input devices (e.g., touchscreen, keyboard, mouse, voice recognition, etc.), network interfaces, etc.

Any patents and applications and other references noted above, including any that may be listed in accompanying filing papers, are incorporated herein by reference. Aspects of the invention can be modified, if necessary, to employ the systems, functions, and concepts of the various references described above to provide yet further implementations of the invention. These and other changes can be made to the invention in light of the above Detailed Description. While the above description describes certain examples of the invention, and describes the best mode contemplated, no matter how detailed the above appears in text, the invention can be practiced in many ways. Details of the system may vary considerably in its specific implementation, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. The actual scope of the invention encompasses not only the disclosed examples, but also all equivalent ways of practicing or implementing the invention.

What is claimed is:

1. A content management computer system comprising:
   a computing device;
   a network interface;
   a non-transitory computer readable media configured to store instructions that when executed by the computing device, cause the computing device to perform operations comprising:
      enable, via the network interface, a user interface to be displayed, the user interface comprising entries corresponding to mesh-linked files, the mesh-linked files comprising files with forward links and backward links, the backward links comprising incoming links from other electronic resources, comprising at least one remote electronic resource, that link to a given file page of a given mesh-linked file, where two or more different pages in a given mesh-linked file are associated with respective different backlinks, wherein at least one of the two or more different pages is associated with a plurality of backlinks;
      provide, via the user interface, a first set of links, comprising at least a search link, a statistics link, and a file galleries link, wherein activation of the statistics link causes statistics comprising how many times a given user shared a page in a given mesh-linked file with another user and/or an average or median time users have viewed a given page in a given mesh-linked file to be presented;
      provide a backlink control, via the user interface;
      at least partly in response to detecting activation of the backlink control, enabling a plurality of backlinks to be displayed, the backlinks corresponding to incoming links from network resources that link to a viewed page, wherein activation of a backlink cause a corresponding network resource to be accessed over a network and rendered;
      at least partly in response to activation of a modification control, enable a modification field to be presented via the user interface, the modification field configured to receive user modifications with respect to one or more items of content of the user interface;

provide a user interface that enables a propagation rule to be specified and received by the user interface, wherein the user interface enables a specification as to whom modifications are to be propagated to;

at least partly in response to receipt of a save or publish instruction, enable one or more items of modified content to be propagated in accordance with at least a first propagation rule, to one or more destinations; and based at least on frequency of access, positioning a first set of links at a first location via the user interface.

2. The content management system as defined in claim 1, the operations further comprising:

detect a download request of a first mesh-linked file from a first remote device;

enable a copy of the first mesh-linked file to be downloaded to the first remote device;

detect a modification of the first mesh-linked file;

identify copies of the first mesh-linked file that reside on remote devices, including at least the first remote device; and enable the identified copies of the first mesh-linked file that reside on remote devices to be replaced by the modified first mesh-linked file.

3. The content management system as defined in claim 1, the operations further comprising:

detect a subscription request of a first mesh-linked file from a first remote device;

detect a modification of the first mesh-linked file;

identify subscribers to the first mesh-linked file; and transmit a notification to the identified subscribers regarding the modification of the first mesh-linked file, the notification comprising a link to the modified first mesh-linked file.

4. The content management system as defined in claim 1, where the first propagation rule is specified by a user that modified the content.

5. The content management system as defined in claim 1, where enabling the plurality of backlinks to be displayed further comprises enabling the plurality of backlinks to be displayed in ascending or descending order.

6. The content management system as defined in claim 1, wherein the given mesh-linked file comprises a formatted text document.

7. The content management system as defined in claim 1, further comprising a compliance search engine configured to enable a user to filter searches to one or more user-specified compliance documents.

8. The content management system as defined in claim 1, further comprising a data store comprising a glossary reference and an acronym reference, the operations further comprising maintaining links between contents of the glossary reference and the acronym reference to text contents of the given mesh-linked file.

9. A computer-implemented method, the method comprising:

enabling a user interface to be displayed, the user interface comprising entries corresponding to mesh-linked documents, the mesh-linked documents comprising documents with forward links and backward links, the backward links comprising incoming links from other electronic resources, comprising at least one remote electronic resource, that link to a given document page of a given mesh-linked document, where two or more different pages in a given mesh-linked document are associated with respective different backlinks, wherein at least one of the two or more different pages is associated with a plurality of backlinks;

provide, via the user interface, a first set of links, comprising at least a statistics link, wherein activation of the statistics link causes statistics comprising how many times a given user shared a page in a given mesh-linked document with another user and/or an average or median time users have viewed a given page in a given mesh-linked document to be presented;

providing a backlink control, via the user interface;

at least partly in response to detecting activation of the backlink control, enabling a plurality of backlinks to be displayed, the backlinks corresponding to incoming links from network resources that link to a viewed page, wherein activation of a backlink cause a corresponding network resource to be accessed and rendered;

at least partly in response to activation of a modification control, enabling a modification interface to be presented via the user interface, the modification interface configured to receive user modifications with respect to one or more items of content of the user interface;

provide a user interface that enables a propagation rule to be specified and received by the user interface, wherein the user interface enables a specification as to whom modifications are to be propagated to;

at least partly in response to receipt of a save instruction, enabling one or more items of modified content to be propagated in accordance with at least a first propagation rule, to one or more destinations; and using a frequency of access, positioning a first set of links at a first location via the user interface.

10. The computer-implemented method as defined in claim 9, the method further comprising:

detecting a download request of a first mesh-linked document from a first remote device;

enabling a copy of the first mesh-linked document to be downloaded to the first remote device;

detecting a modification of the first mesh-linked document;

identifying copies of the first mesh-linked document that reside on remote devices, including at least the first remote device; and enabling the identified copies of the first mesh-linked document that reside on remote devices to be replaced by the modified first mesh-linked document.

11. The computer-implemented method as defined in claim 9, the method further comprising:

detecting a subscription request of a first mesh-linked document from a first remote device;

detecting a modification of the first mesh-linked document;

identifying subscribers to the first mesh-linked document; and transmitting a notification to the identified subscribers regarding the modification of the first mesh-linked document, the notification comprising a link to the modified first mesh-linked document.

12. The computer-implemented method as defined in claim 9, where the first propagation rule is specified by a user that modified the content.

13. The computer-implemented method as defined in claim 9, where enabling the plurality of backlinks to be displayed further comprises enabling the plurality backlinks to be displayed in ascending or descending order.

14. The computer-implemented method as defined in claim 9, wherein the mesh-linked document comprises a formatted text document.

15. The computer-implemented method as defined in claim 9, the method further comprising providing a search user interface enabling a user to provide a search query and to specify a standards filter to limit search results to a specified standard.

16. The computer-implemented method as defined in claim 9, the method further comprising maintaining links between a glossary reference and an acronym reference to text contents of the mesh-linked document.

17. A non-transitory computer readable media configured to store instructions that when executed by a computing device, cause the computing device to perform operations comprising:
  enable a user interface to be displayed, the user interface comprising entries corresponding to mesh-linked documents, the mesh-linked documents comprising one or more documents with forward links and backward links, the backward links comprising incoming links from other electronic resources, comprising at least one remote electronic resource, that link to a given page of a given mesh-linked document, where two or more different pages in a given mesh-linked document are associated with respective different backlinks;
  provide, via the user interface, a first set of links, comprising at least a compliance link and a statistics link, wherein activation of the statistics link causes statistics comprising how many times a given user shared a page in a given mesh-linked document with another user and/or an average or median time users have viewed a given page in a given mesh-linked document to be presented;
  provide a backlink control, via the user interface;
  at least partly in response to detecting activation of the backlink control, enable a plurality of backlinks to be displayed that link to a viewed page, the backlinks corresponding to incoming links from network resources, wherein activation of a backlink cause a corresponding network resource to be accessed and rendered;
  at least partly in response to activation of a modification control, enable a modification interface to be presented via the user interface, the modification interface configured to receive user modifications with respect to one or more items of content of the user interface;
  provide a user interface that enables a propagation rule to be specified and received by the user interface, wherein the user interface enables a specification as to whom modifications are to be propagated to; and
  at least partly in response to receipt of a save instruction, enable one or more items of modified content to be propagated in accordance with at least a first propagation rule;
  using a frequency of access, positioning a first set of links at a first location via the user interface.

18. The non-transitory computer readable media as defined in claim 17, the operations further comprising:
  detect a download request of a first mesh-linked document from a first remote device;
  enable a copy of the first mesh-linked document to be downloaded to the first remote device;
  detect a modification of the first mesh-linked document;
  identify copies of the first mesh-linked document that reside on remote devices, including at least the first remote device; and
  enable the identified copies of the first mesh-linked document that reside on remote devices to be replaced by the modified first mesh-linked document.

19. The non-transitory computer readable media as defined in claim 17, the operations further comprising:
  detect a subscription request of a first mesh-linked document from a first remote device;
  detect a modification of the first mesh-linked document;
  identify subscribers to the first mesh-linked document; and
  transmit a notification to the identified subscribers regarding the modification of the first mesh-linked document, the notification comprising a link to the modified first mesh-linked document.

20. The non-transitory computer readable media as defined in claim 17, where the first propagation rule is specified by a user that modified the content.

21. The non-transitory computer readable media as defined in claim 17, where enabling the plurality of backlinks to be displayed further comprises enabling the backlinks to be displayed in ascending or descending order.

22. The non-transitory computer readable media as defined in claim 17, wherein the mesh-linked document comprises a formatted text document.

23. The non-transitory computer readable media as defined in claim 17, the operations further comprising: provide a search user interface enabling a user to provide a search query and to specify a standards filter to limit search results to a specified standard.

24. The non-transitory computer readable media as defined in claim 17, the operations further comprising: maintain links between a glossary reference and an acronym reference to text contents of the mesh-linked document.

\* \* \* \* \*